United States Patent
Yue

(10) Patent No.: US 11,934,086 B2
(45) Date of Patent: Mar. 19, 2024

(54) METHOD AND DEVICE FOR ADJUSTING PROJECTED IMAGE

(71) Applicant: ZTE CORPORATION, Shenzhen (CN)

(72) Inventor: Li Yue, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 885 days.

(21) Appl. No.: 16/071,429

(22) PCT Filed: Mar. 9, 2016

(86) PCT No.: PCT/CN2016/076011
§ 371 (c)(1),
(2) Date: Apr. 16, 2021

(87) PCT Pub. No.: WO2017/124617
PCT Pub. Date: Jul. 27, 2017

(65) Prior Publication Data
US 2022/0229352 A1  Jul. 21, 2022

(30) Foreign Application Priority Data
Jan. 20, 2016 (CN) .......................... 201610037417.4

(51) Int. Cl.
*G03B 21/14* (2006.01)
*G03B 21/58* (2014.01)
*H04N 9/31* (2006.01)

(52) U.S. Cl.
CPC ........... *G03B 21/147* (2013.01); *G03B 21/58* (2013.01)

(58) Field of Classification Search
CPC .... G03B 21/147; G03B 21/14; H04N 9/3179; H04N 9/3147; H04N 9/3173; H04N 9/3129
See application file for complete search history.

(56) References Cited

U.S. PATENT DOCUMENTS

2010/0130259 A1  5/2010  Lee
2012/0019441 A1*  1/2012  Ueno .................. G03B 21/142
                                                                345/156
(Continued)

FOREIGN PATENT DOCUMENTS

CN    101872108 A    10/2010
CN    102685537 A    9/2012
(Continued)

OTHER PUBLICATIONS

International Search Report dated Oct. 28, 2016 re: Application No. PCT/CN2016/076011, pp. 1-3, citing: CN 101872108 A, CN 104935849 A CN 10484978 A, CN 103019004 A, CN 103995417 A and US 2010/130259 A1.
(Continued)

*Primary Examiner* — Ryan D Howard
(74) *Attorney, Agent, or Firm* — CANTOR COLBURN LLP

(57) ABSTRACT

A method and device for adjusting a projected image are provided. In the method, a distance between a mobile terminal and a projection screen is acquired (S102); and at least one of a display area or a display orientation of a projected image on the projection screen is adjusted at least according to the distance between the mobile terminal and the projection screen (S104). Through the method and the device, a problem in a related art that the projected image can only be adjusted manually by a user is solved, and a viewing angle is adjusted to an optimal viewing angle for viewing a projected image in real time according to a distance with respect to a user, thereby protecting the eyesight of the user and improving user experience.

18 Claims, 4 Drawing Sheets

(56) References Cited

U.S. PATENT DOCUMENTS

2012/0086915 A1* 4/2012 Rosen .................. H04N 9/3147
353/30
2015/0199059 A1 7/2015 Ota

FOREIGN PATENT DOCUMENTS

| CN | 103019004 A | 4/2013 |
|----|-------------|---------|
| CN | 103995417 A | 8/2014 |
| CN | 104184978 A | 12/2014 |
| CN | 104935849 A | 9/2015 |
| JP | 201026327 A | 2/2010 |
| JP | 2015135544 A | 7/2015 |

OTHER PUBLICATIONS

European Search Report for corresponding application EP16885890.0 dated Nov. 16, 2018.

* cited by examiner

METHOD AND DEVICE FOR ADJUSTING PROJECTED IMAGE

TECHNICAL FIELD

The disclosure relates to the field of projection technology, in particular to a method and device for adjusting a projected image.

BACKGROUND

In a related art, a user can only adjust the size of a projection screen by manually moving a projector. However, this adjusting manner is not convenient, and for the user, once the position of the projector is set, the user generally does not like to move the position of the projector although he/she is an active individual. So, in some cases, if the user is far from the projector and the projection screen, user experience of browsing an image may get worse.

At present, focusing of the projector changes according to a distance and angle between the projector and a projection plane, so as to determine the size of the projection screen. Therefore, the user can only adjust the size of the projection screen by manually moving the projector. This way is traditional and not convenient, besides, it is impossible for the user to hold the projector in the entire using process to adjust a direction and a projection area. After an adjustment, the general behavioral habit of the user is not to perform the second adjustment within a short time. A best idea is to provide a more convenient adjusting way for the user, so that the user may adjust and fix the size of the projection screen conveniently.

It can be seen from the above that in the related art, the user puts the projector at a fixed position after determining the projection plane, and does not want to adjust and change the position in a short time. In such case, if the size of the projection screen needs to be adjusted, or if the user wants to watch a projected image better from different positions, the traditional way of projection is unsatisfactory.

There are no effective solutions in the related art for solving a problem that the projected image can only be adjusted by manually moving the projector by the user.

SUMMARY

Some embodiments of the disclosure provide a method and device for adjusting a projected image, which may at least solve a problem in a related art that the projected image can only be adjusted manually by a user.

According to an embodiment of the disclosure, a method for adjusting a projected image is provided, which includes that: a distance between a mobile terminal and a projection screen is acquired; and at least one of a display area or a display orientation of a projected image on the projection screen is adjusted at least according to the distance between the mobile terminal and the projection screen.

In an exemplary embodiment, acquiring the distance between the mobile terminal and the projection screen includes that: the distance L2 between the mobile terminal and the projection screen which is sent by the mobile terminal is received, wherein the L2 is measured by the mobile terminal through an indoor ranging technology.

In an exemplary embodiment, acquiring the distance between the mobile terminal and the projection screen includes that: a specified distance L between a projection device and the projection screen is acquired, and a first distance L1 between the projection device and the mobile terminal is acquired; and the distance L2 between the mobile terminal and the projection screen is calculated according to the specified distance L and the first distance L1.

In an exemplary embodiment, the distance L2 between the mobile terminal and the projection screen is calculated by the following formulae:

$$L2 = L - \sqrt{L1^2 - L3^2}, \text{ when } \alpha \leq 90°;$$

$$L2 = L + \sqrt{L1^2 - L3^2}, \text{ when } \alpha > 90°;$$

where the L is the specified distance, the L1 is the first distance, the $\alpha$ is an included angle between a line segment corresponding to the L and a line segment corresponding to the L1, the L3 is a distance between an intersection point A and an intersection point B, and is equal to sin $\alpha$; wherein the intersection point A is an orthogonal projection point of the projection device onto a plane of the projection screen, and the intersection point B is an orthogonal projection point of the mobile terminal onto the plane of the projection screen.

In an exemplary embodiment, the $\alpha$ is measured by the mobile terminal through an angular velocity transducer.

In an exemplary embodiment, adjusting the display orientation of the projected image on the projection screen at least according to the distance between the mobile terminal and the projection screen includes that: a specified angle between a line segment connecting the projection device and the intersection point B and a line segment connecting the projection device and the intersection point A is acquired; and the projected image is displayed after the specified angle of the projected image is adjusted by using the intersection point A as a starting position.

In an exemplary embodiment, the specified angle $\theta$ is calculated by the following formula:

$$\cos \theta = L/\sqrt{L^2 + L3^2}.$$

In an exemplary embodiment, adjusting the display area of the projected image on the projection screen at least according to the distance between the mobile terminal and the projection screen includes that: it is judged whether the distance between the mobile terminal and the projection screen is between a first threshold and a second threshold; when it is judged that the distance between the mobile terminal and the projection screen is between the first threshold and the second threshold, the display area of the projected image is adjusted based on a preset scale rule according to the distance between the mobile terminal and the projection screen.

In an exemplary embodiment, adjusting the display area of the projected image on the projection screen at least according to the distance between the mobile terminal and the projection screen includes that: a first area corresponding to the distance between the mobile terminal and the projection screen is acquired from a preset rule table; and the display area of the projected image is adjusted to the first area.

In an exemplary embodiment, adjusting the display area of the projected image on the projection screen at least according to the distance between the mobile terminal and the projection screen includes that: the distance between the mobile terminal and the projection screen is multiplied by a specified scale to acquire a second area, wherein the specified scale is a scale value of a standard projection area to a standard projection distance of the projection device; and the display area of the projected image is adjusted to the second area.

In an exemplary embodiment, before the distance between the mobile terminal and the projection screen is acquired, the method further includes that: a connection is established between the projection device and the mobile terminal.

According to another embodiment of the disclosure, a device for adjusting a projected image is provided, which includes: a communication module, an acquiring module and an adjusting module. The communication module is configured to establish a connection with the mobile terminal. The acquiring module is configured to acquire the distance between the mobile terminal and the projection screen. The adjusting module is configured to adjust at least one of the display area or the display orientation of the projected image on the projection screen at least according to the distance between the mobile terminal and the projection screen.

In an exemplary embodiment, the acquiring module includes a receiving unit. The receiving unit is configured to receive the distance L2 between the mobile terminal and the projection screen which is sent by the mobile terminal, wherein the L2 is measured by the mobile terminal through the indoor ranging technology.

In an exemplary embodiment, the acquiring module further includes an acquiring unit and a calculating unit. The acquiring unit is configured to acquire the specified distance L between the projection device and the projection screen, and the first distance L1 between the projection device and the mobile terminal. The calculating unit is configured to calculate the distance L2 between the mobile terminal and the projection screen according to the specified distance L and the first distance L1.

In an exemplary embodiment, the adjusting module includes a judging unit and an adjusting unit. The judging unit is configured to judge whether the distance between the mobile terminal and the projection screen is between the first threshold and the second threshold. The adjusting unit is configured to, when it is judged that the distance between the mobile terminal and the projection screen is between the first threshold and the second threshold, adjust the display area of the projected image based on a preset scale rule according to the distance between the mobile terminal and the projection screen.

In an exemplary embodiment, the adjusting module includes a matching unit and a first adjusting unit. The matching unit is configured to acquire from the preset rule table a first area corresponding to the distance between the mobile terminal and the projection screen. The first adjusting unit is configured to adjust the display area of the projected image to the first area.

In an exemplary embodiment, the adjusting module includes a calculating unit and a second adjusting unit. The calculating unit is configured to multiply the distance between the mobile terminal and the projection screen by the specified scale to acquire the second area, wherein the specified scale is the scale value of the standard projection area to the standard projection distance of the projection device. The second adjusting unit is configured to adjust the display area of the projected image to the second area.

According to some exemplary embodiments, first the distance between the mobile terminal and the projection screen is acquired, and then at least one of the display area or the display orientation of the projected image on the projection screen is adjusted at least according to the distance between the mobile terminal and the projection screen. In such a manner, when the mobile terminal carried by the user moves, an effect that the projection device adjusts the projected image in real time according to the distance between the user and the projection screen is achieved. A problem in a related art that the projected image can only be adjusted manually by a user is solved, and a viewing angle is adjusted to an optimal viewing angle for viewing the projected image in real time according to a distance with respect to the user, thereby protecting the eyesight of the user and improving user experience.

BRIEF DESCRIPTION OF THE DRAWINGS

The accompanying drawings described here are used for providing a deeper understanding of the disclosure, and constitute a part of the application. Schematic embodiments of the disclosure and description thereof are used for illustrating the disclosure and not intended to form an improper limit to the disclosure. In the accompanying drawings.

DETAILED DESCRIPTION OF THE EMBODIMENTS

The disclosure is elaborated below with reference to the accompanying drawings and embodiments. It is to be noted that the embodiments and the features in the embodiments of the application can be combined with each other under the condition of no conflicts.

It is to be noted that the terms like "first" and "second" in the specification, the claims and the accompanying drawings of the disclosure are used for differentiating the similar objects, but do not have to describe a specific order or a sequence.

Figure 1:
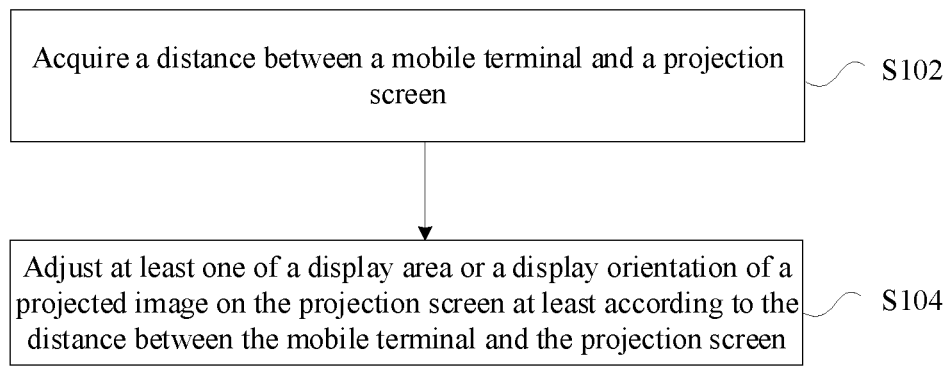
FIG. 1 is a flowchart of a method for adjusting a projected image according to an embodiment of the disclosure.

In an embodiment, a method for adjusting a projected image is provided, which is applied to a projection device side. The method can be completed by the projection device, or performed by other control device to indicate the projection device to adjust the projected image. FIG. 1 is a flowchart of the method for adjusting a projected image according to an embodiment of the disclosure. As shown in FIG. 1, the flow includes the following acts.

In an exemplary embodiment, the projection device includes, but is not limited to, a projector. The mobile terminal is a device that a user viewing the projected image may carry or wear, such as a mobile phone, a projection control pen, a smart watch, and a pair of smart glasses. The mobile terminal also has a communication function, and can establish a communication connection with the projection device or the other control device to perform information interaction. The projection device or the other control device forms a local area network with the mobile terminal, and the projection device (or the other control device) and the mobile terminal can be connected through short-distance technologies, such as Bluetooth, Wireless Fidelity (wifi), wifi direct, Near Field Communication (NFC), and infrared laser.

At act S102, a distance between the mobile terminal and the projection screen is acquired.

In an exemplary embodiment, the distance between the mobile terminal and the projection screen of the projection device is the distance between the user viewing the projected image and the projection screen. In an exemplary embodiment, the distance between the mobile terminal and the projection screen can be sent to the projection device or the other control device after being measured by the mobile terminal, or calculated by the projection device or the other control device.

At act S104, at least one of the display area or the display orientation of the projected image on the projection screen is adjusted at least according to the distance between the mobile terminal and the projection screen.

Through the embodiment, first the distance between the mobile terminal and the projection screen is acquired, and then at least one of the display area or the display orientation of the projected image on the projection screen is adjusted at least according to the distance between the mobile terminal and the projection screen. In such a manner, when the mobile terminal carried by the user moves, an effect that the projection device adjusts the projected image in real time according to the distance between the user and the projection screen is achieved. A problem in a related art that the projected image can only be adjusted manually by a user is solved, and a viewing angle is adjusted to an optimal viewing angle for viewing the projected image in real time according to a distance with respect to the user, thereby protecting the eyesight of the user and improving user experience.

In the embodiment, two ways of acquiring the distance between the mobile terminal and the projection screen are provided. The two ways can be performed separately or used in combination.

In a first way, the distance L2 between the mobile terminal and the projection screen, which is sent by the mobile terminal, is received, wherein the L2 is measured by the mobile terminal through the indoor ranging technology.

In an exemplary embodiment, there may be many technologies of implementing indoor ranging, and two examples are given here.

In pulsed laser ranging, the mobile terminal emits laser, and the laser returns back to the mobile terminal after reaching a barrier (the projection screen); after receiving the returning laser, the mobile terminal can calculate the distance between the mobile terminal and the barrier (the projection screen) according to round-trip time and speed of laser transmission; or after receiving the returning laser, the mobile terminal calculates attenuation of laser intensity, and calculates a link distance of laser transmission through the attenuation of laser intensity and the attenuation of each unit distance of the laser indoors. Alternatively, based on the same principle, the mobile terminal may also acquire the distance between the mobile terminal and the projection screen by emitting sonic wave or ultrasonic wave.

In optical ranging, which is also called camera ranging and implemented by enabling a range sensor, first the mobile terminal emits, being vertical to a physical plane (the projection screen) a ray of light; then, an angle of the emitted ray of light and an optical signal are received by means of a total reflection prism; at last, according to the distance of a reference object input, the distance between the mobile terminal and the projection screen is calculated by using the principle of trigonometric functions.

In a second way, the distance is calculated by the projector. The method includes the following acts.

At act S10, the specified distance L between the projection device and the projection screen and the first distance L1 between the projection device and the mobile terminal are acquired respectively.

At act S12, the distance L2 between the mobile terminal and the projection screen is acquired according to the specified distance and the first distance.

In the embodiment, when the distance between the projection device and the projection screen has no change, the specified distance L specified by the user may be received after the projection device and the projection screen are fixed; or the specified distance may be measured through the indoor ranging technology. For the first distance L1, the projection device has established a connection with the mobile terminal, or the projection device has established a connection with the mobile terminal via other control device, after the mobile terminal establishes the connection, positioning among indoor devices can be performed by using a Bluetooth positioning technology. After the device is connected, it is needed to detect the intensity of Bluetooth signals among the devices in real time, and positioning is performed by detecting the intensity of the Bluetooth signals. Because the projection device and the mobile terminal are in a short-distance transmission, the straight-line distance L1 between the projection device and the mobile terminal can be acquired by performing positioning among the devices by detecting the intensity of the Bluetooth signals and transmitting positioning data of a short-distance device to the projection device. Alternatively, other positioning technologies may be adopted, for example, the technology of using wifi to position, which is implemented through the WLAN series standard value IEEE802.11; the technology of using wifi to position performs positioning by using the mode of experience test combined with signal propagation model.

In the implementation of the second way, before acquiring the distance between the mobile terminal and the projection screen, the projection device may acquire the distance between the mobile terminal and the projection screen by either establishing the connection with the mobile terminal or establishing the connection with the mobile terminal via the other control device.

Figure 2:
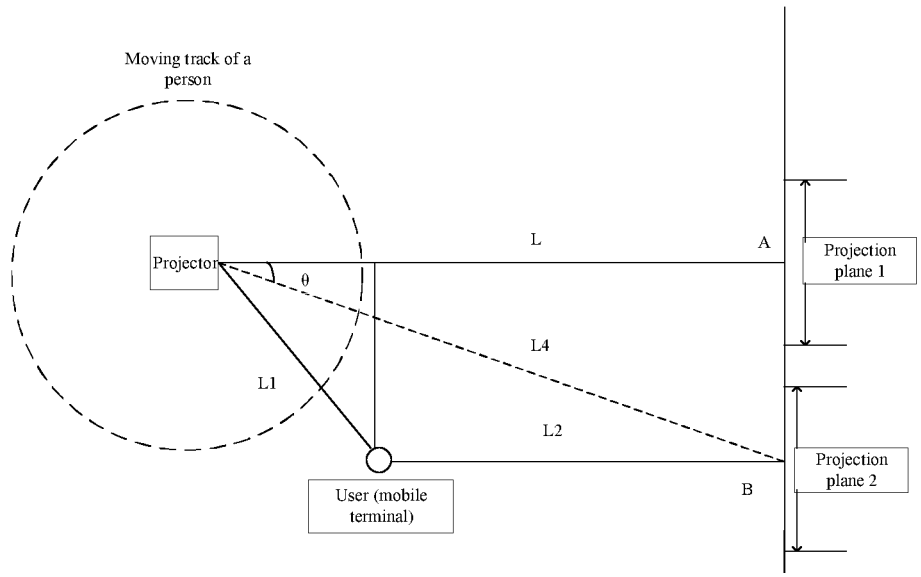
FIG. 2 is a schematic diagram of calculating a top-view projection plane according to an embodiment of the disclosure.

FIG. 2 is a schematic diagram of calculating a top-view projection plane according to an embodiment of the disclosure. As shown in FIG. 2, in a specific calculation process, the second way may be deduced and calculated by the following formulae, and the distance L2 between the mobile terminal and the projection screen is calculated by the following formulae:

$$L2 = L - \sqrt{L1^2 - L3^2}, \text{ when } \alpha \leq 90°;$$

$$L2 = L + \sqrt{L1^2 - L3^2}, \text{ when } \alpha > 90°;$$

where the L is the specified distance, the L1 is the first distance, the α (not shown in FIG. 2) is an included angle between a line segment corresponding to the L and a line segment corresponding to the L1, the L3 is a distance between an intersection point A and an intersection point B, and is equal to sin α; wherein the intersection point A is an orthogonal projection point of the projection device onto a plane of the projection screen, and the intersection point B is an orthogonal projection point of the mobile terminal onto the plane of the projection screen.

In an exemplary embodiment, the α is measured by the mobile terminal through the angular velocity transducer, and the angular velocity transducer may be a gyroscope. When the user holding the mobile terminal and facing the projection screen turns to face the projection screen, the gyroscope may acquire a planar angle of turning, and then may acquire the angle α based on the angle principle of triangle; for example, when the angle calculated by the gyroscope is 150°, the angle α is 30°.

In an exemplary implementation according to the embodiment, adjusting the display orientation of the projected image on the projection screen at least according to the distance between the mobile terminal and the projection screen includes the following acts.

At act S20, a specified angle between a line segment connecting the projection device and the intersection point B and a line segment connecting the projection device and the intersection point A is acquired.

At act S22, the projected image is displayed after adjusting the specified angle of the projected image by using the intersection point A as a starting position.

As shown in FIG. 2, the specified angle may be deduced and calculated by the following way. It can be intuitively seen from FIG. 2 that the final data may be acquired based on the principle of right triangle. The calculation process is as follows:

|AB| is the straight-line distance between A and B, and $|AB| = \sqrt{L1^2 - |L - L2|^2}$, that is, the center point A may reach the center point B only after moving the distance |AB|;

$$L4 = \sqrt{L^2 + |AB|^2},$$

a projection offset angle is cos θ=L/L4, namely cos θ=L/$\sqrt{L^2 + L3^2}$; at last, the specified angle θ, namely the projection offset angle of the projector, is acquired by the cosine formula of the trigonometric functions, and the offset direction is where the user is.

In an exemplary implementation according to the embodiment, adjusting the display area of the projected image on the projection screen at least according to the distance between the mobile terminal and the projection screen includes the following acts.

At act S30, it is judged whether the distance between the mobile terminal and the projection screen is between the first threshold and the second threshold.

At act S32, when it is judged that the distance between the mobile terminal and the projection screen is between the first threshold and the second threshold, the display area of the projected image is adjusted based on a preset scale according to the distance between the mobile terminal and the projection screen.

Due to the limit of the projector and the projection screen, when the distance between the mobile terminal and the projection screen is far enough, the size of the projected image may not be unlimited. If the mobile terminal is not in the room where the projection device is playing, in order to save energy, there is no need to adjust the size of the projected image. Alternatively, when the projected image has been adjusted to the maximum size, there may also be no need to perform the operation of adjusting the projection screen. In another scenario, in order to ensure a basic viewing area of the projected image, when the mobile terminal is very close to the projection screen or the distance between the mobile terminal and the projection screen is 0, the projector has no need to adjust the display area of the projected image. Alternatively, the first threshold and the second threshold may be set according to the size of indoor space and the size of the projection screen; for example, when the length of a room is 10 m, the first threshold and the second threshold may be set to 10 m and 0.5 m respectively.

In an exemplary implementation according to the embodiment, adjusting the display area of the projected image on the projection screen at least according to the distance between the mobile terminal and the projection screen includes the following acts.

At act S40, a first area corresponding to the distance between the mobile terminal and the projection screen is acquired by matching in the preset rule table.

At act S42, the display area of the projected image is adjusted to the first area.

In the exemplary implementation, projecting with a fixed size may be performed according to the preset scale in the projector; for example, the size of projection is fixed at the maximum size, the medium size, and the minimum size; when the vertical distance L2 between the user and the projection plane is less than 2 meters, a projection mode of the minimum size is adopted; when the vertical distance L2 is between 2 meters and 6 meters, the projection mode of the medium size is adopted; when the vertical distance L2 is greater than 6 meters the projection mode of the maximum size is adopted. The distance here may be adjusted according to the actual indoor condition. Herein, the projection mode of the minimum size, the projection mode of the medium size and the projection mode of the maximum size correspond to three different display areas of the projected image.

In another exemplary implementation according to the embodiment, adjusting the display area of the projected image on the projection screen at least according to the distance between the mobile terminal and the projection screen includes the following acts.

At act S50, the distance between the mobile terminal and the projection screen is multiplied by a specified scale to acquire the second area, wherein the specified scale is the scale value of the standard projection area to the standard projection distance of the projection device.

At act S52, the display area of the projected image is adjusted to the second area.

In an exemplary embodiment, calculation may be conducted by the following formula:

$$\frac{L2}{L1} = \frac{\text{projection plane 2}}{\text{projection plane 1}};$$

wherein, the standard projection area is the projection plane 2, the standard projection distance is the L, the second area is the projection plane 1, and the L2 is the distance between the mobile terminal and the projection screen.

In the exemplary implementation, the distance ratio of the distance L2 between the user and the projection plane to the distance L between the projector and the projection plane is equal to the ratio of their sizes of projection, at the same time, constraints of the first threshold and the second threshold may also be added, that is, when the ratio of the L2 to the L is greater than the threshold, the projection plane is upsized, and the projection plane is fixed until the size is the maximum; when the ratio is less than the threshold, the projection plane is downsized correspondingly, and the projection plane is fixed until the size is the minimum.

In an exemplary embodiment, in order to avoid frequent adjustment of the display area of projection due to changing the distance between the mobile terminal and the projection plane too often, which influences the user to view normally, an adjusting period may also be set, for example, one minute. The data of the embodiment described here can be corrected finally. The 2 meters here mainly aims at a normal sight-distance range of the user.

In the above two exemplary implementations, the preset scale between the distance between the mobile terminal and the projection screen and the display area of the projected image may be specifically set according to an actual situation of viewing the projection by human eyes. A dot pitch limitation that the human eyes can see at the distance of 1 meter is the minimum dot diameter (or the minimum straight line diameter) that the human eyes can see at the distance of 1 meter, or the minimum spacing which may be separated by two dots (line diameter) (if the spacing is less than the minimum spacing, the two dots will become a dot or a straight line);

radian=arc length/radius, or arc length=radian*radius;

1 degree=2π/360 radian;

1 minute of arc=1/60 degrees=(2π/360)/60=0.000291 radian;

so, the minimum dot pitch (approximately equal to the arc length) which can be seen at the distance of 1 meter is:

arc length=radian*radius=0.000291*1000 mm=0.291 mm.

in view of probably different length-width ratios of the projection screen, when the length-width ratios of the projection screen are respectively 16:9 and 4:3, the size of projection is shown in Table 1.

TABLE 1

| Length-width ratio of the projection screen | Interval of projection distance L2 | Size of projection (diagonal of screen) |
| --- | --- | --- |
| 16:9 for resolution 1280*720 | 1 meter-2 meters | A value between 16.82 inches and 33.64 inches |
| 4:3 for resolution 1024*768 | 1 meter-2 meters | A value between 14.66 inches and 29.32 inches |
| 16:9 for resolution 1280*720 | 2 meters-3 meters | A value between 33.64 inches and 50.46 inches |
| 4:3 for resolution 1024*768 | 2 meters-3 meters | A value between 29.32 inches and 43.98 inches |

Through the above description of implementation modes, those skilled in the art can clearly know that the method can be implemented by means of software plus a necessary common hardware platform, certainly by means of hardware; but in many cases, the former is the better implementation mode. Based on this understanding, the technical solutions of the disclosure substantially or the part making a contribution to the prior art can be embodied in the form of software product; the computer software product is stored in storage medium (e.g. ROM/RAM, a magnetic disk, and a compact disc) and includes a number of instructions to make a terminal device (which can be a mobile phone, a computer, a server or a network device, etc.) perform the method in each embodiment of the disclosure.

In an embodiment, a device for adjusting a projected image is also provided. The device may be set in the projection device or other devices which can change the display size. The device is configured to implement the above embodiments and preferred implementations, which will not be elaborated herein. The term "module" used below can realize a combination of software and/or hardware with an intended function. Although the device described in the following embodiment is realized through software better, the realization through hardware or a combination of software and hardware is possible and conceived.

Figure 3:
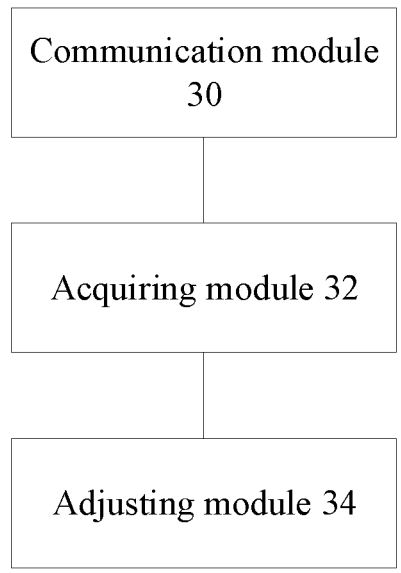
FIG. 3 is a structure diagram of a device for adjusting a projected image according to an embodiment of the disclosure.

FIG. 3 is a structure diagram of the device for adjusting a projected image according to an embodiment of the disclosure. As shown in FIG. 3, the device includes:

a communication module 30, which is configured to establish a connection with the mobile terminal;

an acquiring module 32, which is configured to acquire the distance between the mobile terminal and the projection screen; and an adjusting module 34, which is configured to adjust at least one of the display area or the display orientation of the projected image on the projection screen at least according to the distance between the mobile terminal and the projection screen.

Figure 4:
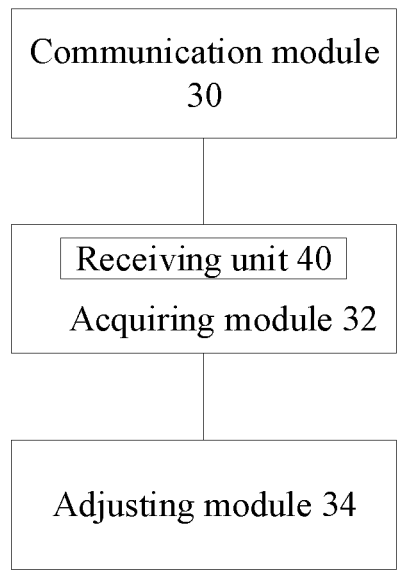
FIG. 4 is an exemplary structure diagram 1 of the device for adjusting a projected image according to an embodiment of the disclosure.

FIG. 4 is an exemplary structure diagram 1 of the device for adjusting a projected image according to an embodiment of the disclosure. As shown in FIG. 4, except all the modules shown in FIG. 3, the acquiring module 32 of the device further includes: a receiving unit 40, which is configured to receive the distance L2 between the mobile terminal and the projection screen which is sent by the mobile terminal, wherein the L2 is measured by the mobile terminal through the indoor ranging technology.

Figure 5:
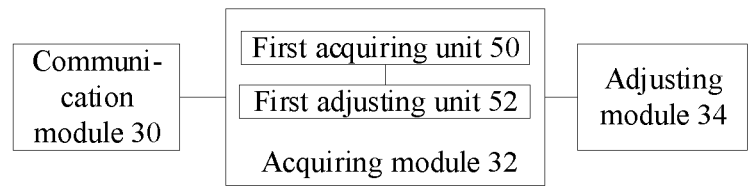
FIG. 5 is an exemplary structure diagram 2 of the device for adjusting a projected image according to an embodiment of the disclosure.

FIG. 5 is an exemplary structure diagram 2 of the device for adjusting a projected image according to an embodiment of the disclosure. As shown in FIG. 5, except all the modules shown in FIG. 3, the acquiring module 32 of the device further includes: a first acquiring unit 50 and a first adjusting unit 52; wherein, the first acquiring unit 50 is configured to acquire the specified angle between a line segment connecting the projection device and the intersection point B and a line segment connecting the projection device and the intersection point A; and the first adjusting unit 52 is configured to display the projected image after adjusting the specified angle from the intersection point A as the starting position.

Figure 6:
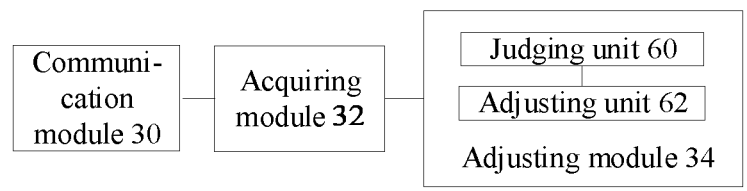
FIG. 6 is an exemplary structure diagram 3 of the device for adjusting a projected image according to an embodiment of the disclosure.

FIG. 6 is an exemplary structure diagram 3 of the device for adjusting a projected image according to an embodiment of the disclosure. As shown in FIG. 6, except all the modules shown in FIG. 3, the adjusting module 34 of the device further includes: a judging unit 60 and an adjusting unit 62; wherein, the judging unit 60 is configured to judge whether the distance between the mobile terminal and the projection screen is between the first threshold and the second threshold;

the adjusting unit 62 is configured to, when it is judged that the distance between the mobile terminal and the projection screen is between the first threshold and the second threshold, adjust the display area of the projected image based on a preset scale rule according to the distance between the mobile terminal and the projection screen.

Figure 7:
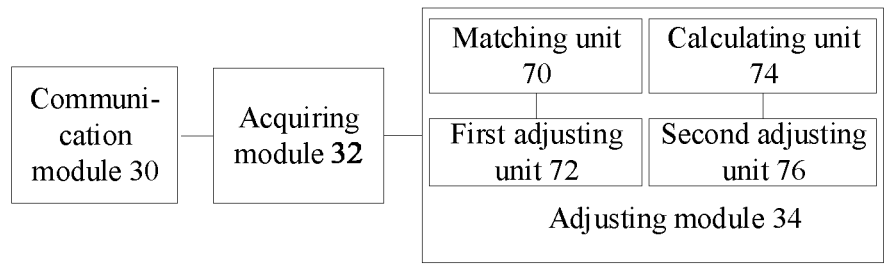
FIG. 7 is an exemplary structure diagram 4 of the device for adjusting a projected image according to an embodiment of the disclosure.

FIG. 7 is an exemplary structure diagram 4 of the device for adjusting a projected image according to an embodiment of the disclosure. As shown in FIG. 7, except all the modules shown in FIG. 3, the adjusting module 34 of the device further includes: a matching unit 70, a first adjusting unit 72, a calculating unit 74 and a second adjusting unit 76; wherein, the matching unit 70 is configured to acquire from the preset rule table a first area corresponding to the distance between the mobile terminal and the projection screen;

the first adjusting unit 72 is configured to adjust the display area of the projected image to the first area;

the calculating unit 74 is configured to multiply the distance between the mobile terminal and the projection screen by the specified scale to acquire the second area, wherein the specified scale is the scale value of the standard projection area to the standard projection distance of the projection device; and the second adjusting unit 76 is configured to adjust the display area of the projected image to the second area.

It is to be noted here that the matching unit 70 and the first adjusting unit 72 are in matching use, the calculating unit 74 and the second adjusting unit 76 are in matching use, the matching unit 70, the first adjusting unit 72, the calculating unit 74 and the second adjusting unit 76 may be set in the adjusting module 34 at the same time, or only a pair of modules in matching use is set in the adjusting module 34, so that the adjustment of the display area of the projected image is implemented.

An elaboration is given below in combination with the exemplary implementations of the embodiments of the disclosure.

Figure 8:
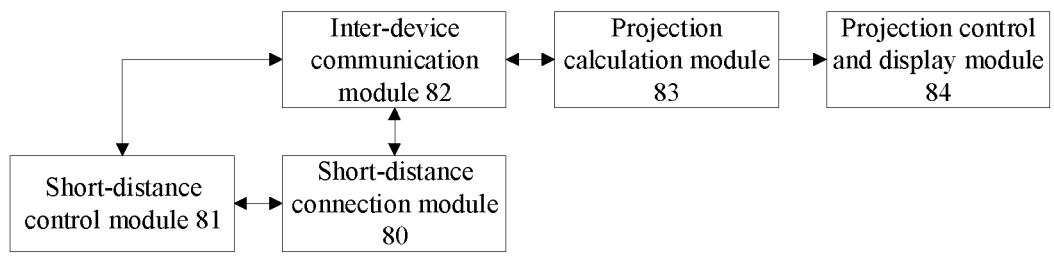
FIG. 8 is a schematic diagram showing connections among devices according to an exemplary embodiment of the disclosure.

FIG. 8 is a schematic diagram showing connections among devices according to an exemplary embodiment of the disclosure. As shown in FIG. 8, the device of the embodiment includes a short-distance connection module 80, a short-distance control module 81, an inter-device communication module 82, a projection calculation module 83, and a projection control and display module 84; the distance and angle between the user and the projection plane are calculated through interactions among these devices, wherein interaction directions are shown in FIG. 8; on this basis, a reasonable display size and angle of the projection plane is calculated, so as to present a better projection effect to the user.

In the embodiment, the distance between the user (the mobile terminal) and the projection plane (the projection screen) is calculated, and the display of the projection plane is adjusted based on this basis; in view of comfort of the user's eyes, a proper projection plane is calculated for projection; finally a projected display is performed through a projection display module, and the display of a reasonable projection plane is provided.

The embodiment may also include the following exemplary implementation scenario: on one hand, the user may directly set a position projection display mode, that is, the device determines, through the interaction with the short-distance device, a position interval of the user on the same plane, and adjusts the projection plane on this basis, and provides a reasonable projection display plane; on the other hand, the user may also manually adjust slightly through the short-distance device, for example, the user adjusts the size of the projection plane, the display orientation of the projection plane, and so on; at last, besides the above two situations, it is also needed to consider whether the user is in the same room; generally, a wearable device can be carried and controlled easily, but an intelligent terminal device cannot be carried in some space like home, so there are two situations considered; in one situation, if the wearable device is disconnected with the projection device or the signal gets weaker, it is considered that the user is not in the room, and if the device is not reconnected in 10 minutes, the terminal device sleeps automatically; for the intelligent device, the user needs to set time of connection. If the device is connected for a long time, but has no operations after rated time (which can be set by the user), the projection device may sleep automatically. Particularly, the scenario includes the following acts.

At act S60, the devices are connected through the short-distance technologies, such as Bluetooth and wifi; even in some cases, the devices supporting an infrared technology may also be connected to form a small internal LAN as a basic network for communications among the devices.

At act S62, the devices communicate with each other through the communication module, and in the process of communications, data of relative positions between the devices is transmitted to the projection calculation module.

At act S64, the main work of the projection calculation module is processing the data transmitted from the communication module of the mobile phone, and after integrating the data, determining the relative positions between the projection device and the projection plane, and transferring the relative positions to a projection display device.

At act S66, the projection display device selects a proper size of the projection plane according to the data and controls the projection display. It is to be noted here that the size of the projection plane and a distance matrix diagram may be preset in the module, so in a normal situation of the module, a proper projection display plane may be selected only by performing data matching, which reduces unnecessary calculating processes. In an exemplary embodiment, for further customized modifications of the projected image, the user may modify some parameters of the projection device through the connected short-distance device, thereby providing better user experience on the projected image.

As shown in FIG. 8, interrelationships among the devices and directions of data transmission in the embodiment may include the following acts.

At act S70, the connection and disconnection between the devices is controlled through the short-distance connection module 80, and whether the connection between the devices is normal is detected in the process.

At act S72, after the connection between the devices is determined, communication and data exchange between the devices is performed through the inter-device communication module 82, so as to acquire setting data and position data between the devices as a data source of the projection calculation module 83.

At act S74, the projection calculation module 83 mainly needs to calculate a relative distance between the device and the projection plane. If the device is set automatically, the projection calculation module 83 may output distance data to the projection control and display module 84 directly, and then the projection control and display module 84 controls the projection plane to be displayed correctly after completing matching according to a data table.

The short-distance wireless communication mode in the embodiment may be implemented by either Bluetooth, wifi, NFC, and so on, or various short-distance functions like wifi direct extending from infrared technology or wifi. The connection module between the devices mainly controls the connection and disconnection between the devices, and forms a small LAN. The use scope of the LAN in the embodiment is mainly transmitting the distance data, and interfaces may be reserved for extending other applications and functions.

The modules shown in FIG. 8 are described in detail below.

The short-distance control module 81 provides a setting interface for the user when the device is at the short-distance device end (the mobile terminal) on one hand, and interacts with the projection device through the device to provide position information of the user on the other hand.

The short-distance connection module 80 is relative to the projection device and the short-distance device, that is, the short-distance connection module needs cooperation of the two devices to form a small LAN, and performs connection control between the devices, mainly referring to the connection between the devices, whether the devices are disconnected, and providing data of connection and disconnection to a communication end.

The inter-device communication module 82 also needs the cooperation of the two devices, mainly referring to transmitting communication data and ending the transmission of the communication data, transmitting data in the small LAN, setting a projection parameter and selecting the projection mode.

The projection calculation module 83 completes a calculation task in the projection device, and mainly acquires the position information between two devices from the communication module; generally, the distance between the projection device and the projection plane may be considered as a fixed length L; the data has been fixed when the user controls the projection device, and may be directly acquired through the existing software technology in the module. The remaining calculation tasks are: first, using a short-distance ranging technology to calculate the distance L1 between the projection device and the short-distance device, and acquire the distance L2 between the short-distance device (the user) and the projection plane by ranging; second, based on the acquired L1 and L2, calculating a moving angle θ of the final projection plane after the user moves. So, the terminal is required to have a ranging function which can measure the distance between the terminal device (including the wearable device) and the projector and the projection plane. Moreover, two hypotheses are provided here, that is, if the center point of projection generated by the projector on the projection plane may be determined initially, wherein the center point of projection is the center of the projection plane after projecting, in the moving process of the user, the projector may move the projection center according to the angle calculated finally; when the projection center moves, the whole projection plane moves leftwards or rightwards according to the angle; in the process, the user, the projector, the L, the L1, the L2 and the θ may be looked, from a top-view angle, as dots and straight lines on a two-dimensional plane, and then the following top-view calculation diagram may be obtained, as show in FIG. 2.

The projection control and display module 84 performs a process of displaying the size of the projection screen of the projection device according to the data of the calculation module of the projector; in the process, setting a matching table of size and distance in the module may be considered; after the distance data is acquired through the table, the size of projection may be set directly from the point of view of protecting the eyesight of the user, thereby completing the final projection.

In the process of projection, the projection control and display module 84 may implement functions as follows.

Firstly, in the process of projection, if a slight movement of the user is sensed, the projection control and display module 84 does not adjust the projection frequently in the scope of a circle with a 1-meter diameter on the condition of not influencing the normal viewing of the user. In the embodiment, the size of projection may be fixed, that is, the size of projection is fixed at the maximum size, the medium size, and the minimum size. When the vertical distance L2 between the user and the projection plane is less than 2 meters, the projection mode of the minimum size is adopted; when the vertical distance L2 is between 2 meters and 6 meters, the projection mode of the medium size is adopted; when the vertical distance L2 is greater than 6 meters the projection mode of the maximum size is adopted. The distance here may be adjusted according to the actual indoor condition.

Secondly, if the projection control and display module 84 judges that the user moves to other room or disconnects, according to the presetting of the user, the projection screen is enabled to sleep after playing for a while, so as to reduce electricity consumption.

Thirdly, when the user moves at will in the room, it is only needed to adjust the direction of the projector slightly. Besides, for ensuring good user experience, some good UI (User Interface) interfaces may be designed, which may provide the user with the adjustment of the projection plane and the final projection adjustment performed according to the algorithm based on the former adjustment.

Figure 9:
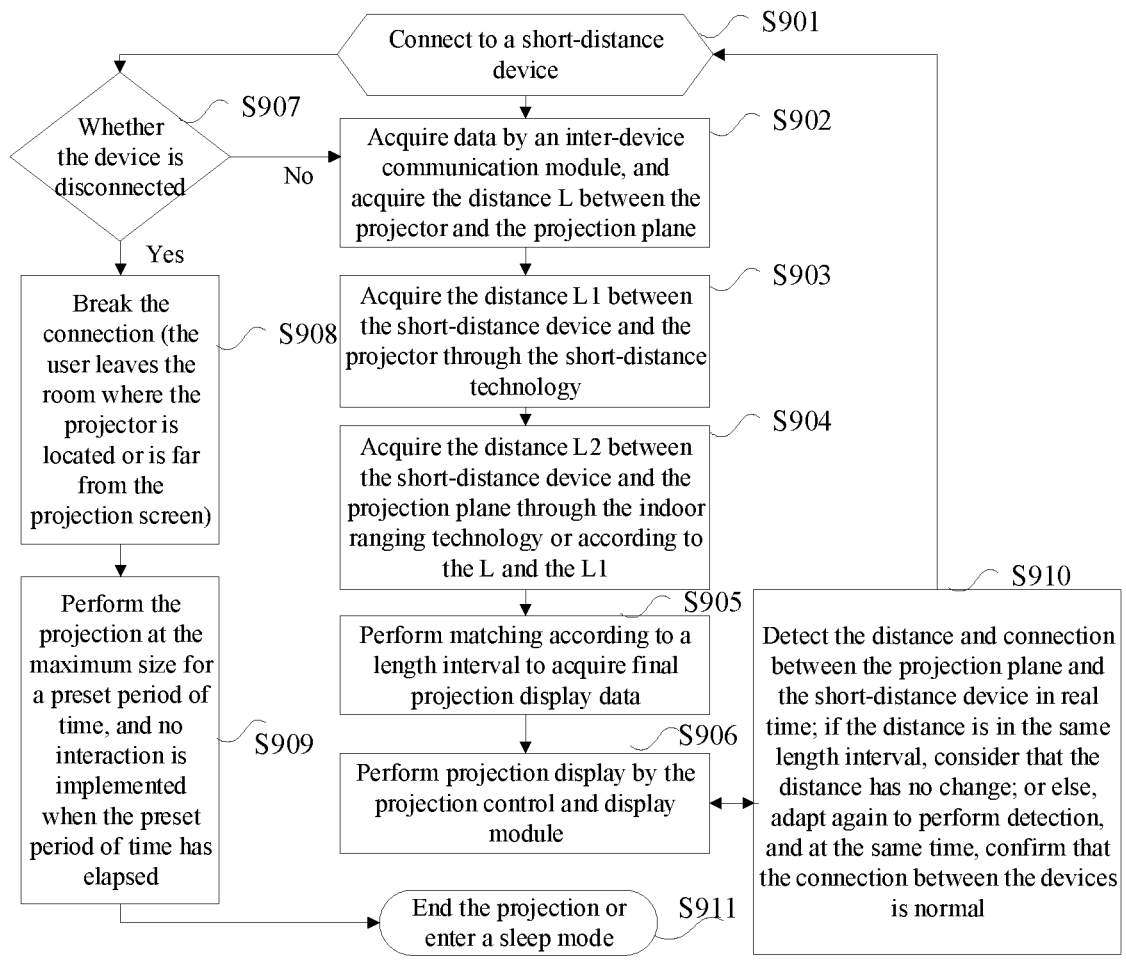
FIG. 9 is a flowchart of interactions among modules in a projection system according to an exemplary embodiment of the disclosure.

FIG. 9 is a flowchart of interactions among modules in a projection system according to an exemplary embodiment of the disclosure. As shown in FIG. 9, a flowchart of system data provides a schematic diagram of data interactions among the short-distance device, the projection device and the projection plane. The user may confirm through FIG. 9 how the user performs interactions by means of the short-distance device (the wearable device or the intelligent terminal device) and completes the final projection. The flow includes the following acts.

At act S901, the short-distance device is connected.

At act S902, the inter-device communication module acquires data, and the distance L between the projector and the projection plane is acquired.

At act S903, the distance L1 between the short-distance device and the projector is acquired through the short-distance technology.

At act S904, the distance L2 between the short-distance device and the projection plane is acquired through the indoor ranging technology or according to the L and the L1.

At act S905, matching is performed according to a length interval to acquire final projection display data.

At act S906, the projection control and display module performs projection display.

At act S907, it is judged whether the device is disconnected; if no, S902 is performed; if yes, S908 is performed.

At act S908, the connection breaks down (the user leaves the room where the projector is located or is far from the projection screen).

At act S909, the projection is performed at the maximum size for a preset period of time, and no interaction is implemented when the preset period of time has elapsed, S911 is performed.

At act S910, in the process of projection, the distance and connection between the projection plane and the short-distance device are detected in real time. If the distance is in the same length interval, it is considered that the distance has no change; or else, it is needed to adapt again to perform detection; at the same time, the connection between the devices is normal.

At act S911, the projection is ended or a sleep mode is entered.

Figure 10:
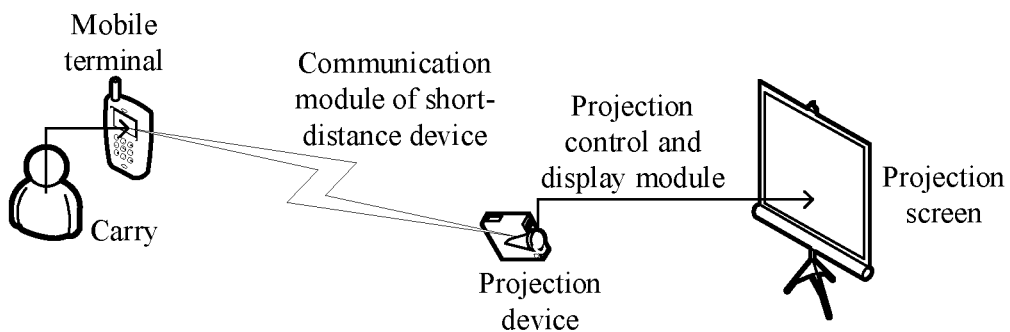
FIG. 10 is a schematic diagram of projection according to an exemplary embodiment of the disclosure.

FIG. 10 is a schematic diagram of projection according to an exemplary embodiment of the disclosure. As shown in FIG. 10, the user carries the mobile terminal, the mobile terminal performs communications and data interactions with the projection device via the communication module of the short-distance device, and the projection device projects and displays, through the projection control and display module, the projected image on the projection screen.

Through the embodiment, a problem that at present the projector cannot perform the projection adjustment according to the position of the user during use is solved; generally, the user trends to make the projection device project at a fixed position, so it is considered that under the condition of the related art, the relative distance between the user and the projection plane may be calculated through the ranging technology from the point of view of protecting the eyesight of the user, thereby the size and orientation of the projected image are automatically controlled in the projection device. In such a manner, the projection device may automatically adjust the size and relative position of the projection plane as long as the user and the projection device are in the same room, so that the user may view the projection anytime at any angle without moving or changing the fixed position of the projection device.

It is to be noted that the above modules may be implemented by software or hardware; for the latter, it may be implemented by, but is not limited to, the following way. All the modules are in the same processor; or, the modules are in many processors separately.

An embodiment of the disclosure also provides storage medium. In an exemplary embodiment, the storage medium may be set to store program codes for performing the following acts.

At act S1, the projection establishes a connection with the mobile terminal.

At act S2, the projection device acquires the distance between the mobile terminal and the projection screen.

At act S3, the projection device adjusts at least one of the display area or the display orientation of the projected image on the projection screen at least according to the distance between the mobile terminal and the projection screen.

In an exemplary embodiment, the storage medium may include, but is not limited to, a USB flash disk, a Read-Only Memory (ROM), a Random Access Memory (RAM), a mobile hard disk, a magnetic disk or a compact disc, and other media which can store program codes.

In an exemplary embodiment, the processor performs, according to the program codes stored in the storage medium, the act that the projection establishes the connection with the mobile terminal.

In an exemplary embodiment, the processor performs, according to the program codes stored in the storage medium, the act that the projection device acquires the distance between the mobile terminal and the projection screen.

In an exemplary embodiment, the processor performs, according to the program codes stored in the storage medium, the act that the projection device adjusts at least one of the display area or the display orientation of the projected image on the projection screen at least according to the distance between the mobile terminal and the projection screen.

Alternatively, the specific examples in the embodiment may refer to the examples described in the above embodiments and exemplary implementations, and will not be repeated here.

Obviously, those skilled in the art should appreciate that the above modules and acts of the disclosure can be implemented by a general-purpose computing device, and can be centralized in a single computing device or distributed on a network composed of multiple computing devices; alternatively, the above modules and acts of the disclosure can be implemented by a program code which is capable of being executed by the computing device, so that they can be stored in a storage device and executed by the computing device. In some situations, the presented or described acts can be executed in an order different from that described here; or the presented or described acts are made into integrated circuit modules, respectively; or multiple modules and acts are made into a single integrated circuit module to realize. In this way, the disclosure is not limited to any particular combination of hardware and software.

The above is only the preferred embodiment of the disclosure and not intended to limit the disclosure; for those skilled in the art, the disclosure may have various modifications and changes. Any modifications, equivalent replacements, improvements and the like within the spirit and principle of the disclosure shall fall within the scope of the claims of the disclosure.

INDUSTRIAL APPLICABILITY

As mentioned above, the method and device for adjusting a projected image provided by the disclosure have the following effects. A problem in a related art that the projected image can only be adjusted manually by the user is solved, and a viewing angle is adjusted to an optimal viewing angle for viewing the projected image in real time according to the distance with respect to the user, thereby protecting the eyesight of the user and improving user experience.

What is claimed is:

1. A method for adjusting a projected image, comprising:
acquiring a distance between a mobile terminal and a projection screen; and
adjusting at least one of a display area or a display orientation of a projected image on the projection screen at least according to the distance between the mobile terminal and the projection screen;
wherein acquiring the distance between the mobile terminal and the projection screen comprises:
acquiring a specified distance L between a projection device and the projection screen, and a first distance L1 between the projection device and the mobile terminal;
calculating a distance L2 between the mobile terminal and the projection screen according to the specified distance L and the first distance L1.

2. The method as claimed in claim 1, wherein acquiring the distance between the mobile terminal and the projection screen comprises:
receiving the distance L2 between the mobile terminal and the projection screen which is sent by the mobile terminal, wherein the L2 is measured by the mobile terminal through an indoor ranging technology.

3. The method as claimed in claim 1, wherein the distance L2 between the mobile terminal and the projection screen is calculated by the following formulae:

$$L2 = L - \sqrt{L1^2 - L3^2}, \text{ when } \alpha \leq 90°;$$

$$L2 = L + \sqrt{L1^2 - L3^2}, \text{ when } \alpha > 90°;$$

where the L is the specified distance, the L1 is the first distance, the $\alpha$ is an included angle between a line segment corresponding to the L and a line segment corresponding to the L1, the L3 is a distance between an intersection point A and an intersection point B, and is equal to sin $\alpha$ wherein the intersection point A is an orthogonal projection point of the projection device onto a plane of the projection screen, and the intersection point B is an orthogonal projection point of the mobile terminal onto the plane of the projection screen.

4. The method as claimed in claim 3, wherein the $\alpha$ is measured by the mobile terminal through an angular velocity transducer.

5. The method as claimed in claim 3, wherein adjusting the display orientation of the projected image on the projection screen at least according to the distance between the mobile terminal and the projection screen comprises:
acquiring a specified angle between a line segment connecting the projection device and the intersection point B and a line segment connecting the projection device and the intersection point A; and
displaying the projected image after adjusting the specified angle of the projected image by using the intersection point A as a starting position.

6. The method as claimed in claim 5, wherein the specified angle $\theta$ is calculated by the following formula:

$$\cos \theta = L / \sqrt{L^2 + L3^2}.$$

7. The method as claimed in claim 1, wherein adjusting the display area of the projected image on the projection screen at least according to the distance between the mobile terminal and the projection screen comprises:
judging whether the distance between the mobile terminal and the projection screen is between a first threshold and a second threshold;
when it is judged that the distance between the mobile terminal and the projection screen is between the first threshold and the second threshold, adjusting the display area of the projected image based on a preset scale rule according to the distance between the mobile terminal and the projection screen.

8. The method as claimed in claim 1, wherein adjusting the display area of the projected image on the projection screen at least according to the distance between the mobile terminal and the projection screen comprises:
acquiring from a preset rule table a first area corresponding to the distance between the mobile terminal and the projection screen; and
adjusting the display area of the projected image to the first area.

9. The method as claimed in claim 1, wherein adjusting the display area of the projected image on the projection screen at least according to the distance between the mobile terminal and the projection screen comprises:
multiplying the distance between the mobile terminal and the projection screen by a specified scale to acquire a second area, wherein the specified scale is a scale value of a standard projection area to a standard projection distance of the projection device; and
adjusting the display area of the projected image to the second area.

10. The method as claimed in claim 1, wherein before acquiring the distance between the mobile terminal and the projection screen, further comprising: establishing a connection between the projection device and the mobile terminal.

11. A non-transitory storage medium, in which program codes are stored, wherein the program codes, when being executed by a computing device, cause the computing device to execute the method as claimed in claim 1.

12. A device for adjusting a projected image, comprising:
a communication module, which is configured to establish a connection with a mobile terminal;
an acquiring module, which is configured to acquire a distance between the mobile terminal and a projection screen; and
an adjusting module, which is configured to adjust at least one of a display area or a display orientation of a projected image on the projection screen at least according to the distance between the mobile terminal and the projection screen;
wherein the acquiring module comprises:
an acquiring unit, which is configured to acquire a specified distance L between a projection device and the projection screen, and a first distance L1 between the projection device and the mobile terminal; and
a calculating unit, which is configured to calculate a distance L2 between the mobile terminal and the projection screen according to the specified distance L and the first distance L1.

13. The device as claimed in claim 12, wherein the acquiring module comprises:
a receiving unit, which is configured to receive the distance L2 between the mobile terminal and the projection screen which is sent by the mobile terminal, wherein the L2 is measured by the mobile terminal through an indoor ranging technology.

14. The device as claimed in claim 12, wherein the adjusting module comprises:
a judging unit, which is configured to judge whether the distance between the mobile terminal and the projection screen is between a first threshold and a second threshold; and
an adjusting unit, which is configured to, when it is judged that the distance between the mobile terminal and the projection screen is between the first threshold and the second threshold, adjust the display area of the projected image based on a preset scale rule according to the distance between the mobile terminal and the projection screen.

15. The device as claimed in claim 12, wherein the adjusting module comprises:
a matching unit, which is configured to acquire from a preset rule table a first area corresponding to the distance between the mobile terminal and the projection screen; and
a first adjusting unit, which is configured to adjust the display area of the projected image to the first area.

16. The device as claimed in claim 12, wherein the adjusting module comprises:
a calculating unit, which is configured to multiply the distance between the mobile terminal and the projection screen by a specified scale to acquire a second area, wherein the specified scale is a scale value of a standard projection area to a standard projection distance of the projection device; and a second adjusting unit, which is configured to adjust the display area of the projected image to the second area.

17. The device as claimed in claim 12, wherein the distance L2 between the mobile terminal and the projection screen is calculated by the following formulae:

$$L2 = L - \sqrt{L1^2 - L3^2}, \text{ when } \alpha \leq 90°;$$

$$L2 = L + \sqrt{L1^2 - L3^2}, \text{ when } \alpha > 90°;$$

where the L is the specified distance, the L1 is the first distance, the α is an included angle between a line segment corresponding to the L and a line segment corresponding to the L1, the L3 is a distance between an intersection point A and an intersection point B, and is equal to sin α;

wherein the intersection point A is an orthogonal projection point of the projection device onto a plane of the projection screen, and the intersection point B is an orthogonal projection point of the mobile terminal onto the plane of the projection screen.

18. The device as claimed in claim 17, wherein the adjusting module is configured to:

acquire a specified angle between a line segment connecting the projection device and the intersection point B and a line segment connecting the projection device and the intersection point A; and display the projected image after adjusting the specified angle of the projected image by using the intersection point A as a starting position.

\* \* \* \* \*